United States Patent
Kondo

(10) Patent No.: US 7,157,159 B2
(45) Date of Patent: Jan. 2, 2007

(54) INFRARED RAY CUT FILTER AND METHODS FOR MANUFACTURING THE SAME

(75) Inventor: Yasuhiro Kondo, Nagoya (JP)

(73) Assignee: Elmo Company, Limited (JP)

( * ) Notice: Subject to any disclaimer, the term of this patent is extended or adjusted under 35 U.S.C. 154(b) by 243 days.

(21) Appl. No.: 10/773,671

(22) Filed: Feb. 6, 2004

(65) Prior Publication Data

US 2004/0202897 A1  Oct. 14, 2004

(30) Foreign Application Priority Data

Apr. 10, 2003  (JP) .............................. 2003-105980

(51) Int. Cl.
  *B32B 17/06* (2006.01)
(52) U.S. Cl. ...................... 428/699; 428/689; 428/701; 428/702; 428/428; 428/432
(58) Field of Classification Search ................ 428/689, 428/699, 428, 432, 701, 702
  See application file for complete search history.

(56) References Cited

U.S. PATENT DOCUMENTS 6,391,400 B1 * 5/2002 Russell et al. ................ 428/34

FOREIGN PATENT DOCUMENTS

JP  2000-314808  11/2000

\* cited by examiner

*Primary Examiner*—John J. Zimmerman
*Assistant Examiner*—G. Blackwell
(74) *Attorney, Agent, or Firm*—Ostrolenk, Faber, Gerb & Soffen, LLP

(57) ABSTRACT

A reflective-type infrared ray cut filter and associated manufacturing method wherein the time and cost of manufacture are reduced and manufacturing efficiency is improved are provided. In the infrared ray cut filter 10 comprising a multilayer membrane 200 composed of no less than 16 but no more than 32 layers of a high-refractive index thin membrane 210 and a low-refractive index thin membrane 220 laminated in an alternating fashion and formed on a glass substrate 100, the first layer from the side of the glass substrate 100 is a high-refractive index thin membrane 210 and the last layer is a low-refractive index thin membrane 220, and where the design wavelength is deemed $\lambda$, the first and second layers are formed to have an optical thickness of no less than $\lambda/4$, the third layer through a prescribed layer are formed to have an optical thickness of no more than $\lambda/4$, the layers between the prescribed layer and the last layer are formed to have an optical thickness of no less than $\lambda/4$, and the last layer is formed to have an optical thickness of no more than $\lambda/4$.

6 Claims, 15 Drawing Sheets

⟨16 LAYERS( $\lambda$ =750nm)⟩

| LAYER | MATERIAL | OPTICAL THICKNESS | |
|---|---|---|---|
| 1 | TiO₂ | 0.2707 | } ≧(QUARTER-WAVE) |
| 2 | SiO₂ | 0.2577 | |
| 3 | TiO₂ | 0.2115 | } ≦(QUARTER-WAVE) |
| 4 | SiO₂ | 0.2287 | |
| 5 | TiO₂ | 0.2323 | |
| 6 | SiO₂ | 0.2476 | |
| 7 | TiO₂ | 0.2729 | } ≧(QUARTER-WAVE) |
| 8 | SiO₂ | 0.2885 | |
| 9 | TiO₂ | 0.3011 | |
| 10 | SiO₂ | 0.3196 | |
| 11 | TiO₂ | 0.3238 | |
| 12 | SiO₂ | 0.3304 | |
| 13 | TiO₂ | 0.3372 | |
| 14 | SiO₂ | 0.3265 | |
| 15 | TiO₂ | 0.3064 | |
| 16 | SiO₂ | 0.1402 | ≦(QUARTER-WAVE) |

(FIRST EMBODIMENT)

Fig.2

⟨16 LAYERS(λ =750nm)⟩

| LAYER | MATERIAL | OPTICAL THICKNESS | |
|---|---|---|---|
| 1 | TiO$_2$ | 0.2707 | } ≧(QUARTER-WAVE) |
| 2 | SiO$_2$ | 0.2577 | |
| 3 | TiO$_2$ | 0.2115 | } ≦(QUARTER-WAVE) |
| 4 | SiO$_2$ | 0.2287 | |
| 5 | TiO$_2$ | 0.2323 | |
| 6 | SiO$_2$ | 0.2476 | |
| 7 | TiO$_2$ | 0.2729 | } ≧(QUARTER-WAVE) |
| 8 | SiO$_2$ | 0.2885 | |
| 9 | TiO$_2$ | 0.3011 | |
| 10 | SiO$_2$ | 0.3196 | |
| 11 | TiO$_2$ | 0.3238 | |
| 12 | SiO$_2$ | 0.3304 | |
| 13 | TiO$_2$ | 0.3372 | |
| 14 | SiO$_2$ | 0.3265 | |
| 15 | TiO$_2$ | 0.3064 | |
| 16 | SiO$_2$ | 0.1402 | ≦(QUARTER-WAVE) |

(FIRST EMBODIMENT)

Fig.3

⟨18 LAYERS(λ =750nm)⟩

| LAYER | MATERIAL | OPTICAL THICKNESS | |
|---|---|---|---|
| 1 | TiO₂ | 0.2643 | } ≧(QUARTER-WAVE) |
| 2 | SiO₂ | 0.2574 | |
| 3 | TiO₂ | 0.2181 | } ≦(QUARTER-WAVE) |
| 4 | SiO₂ | 0.2268 | |
| 5 | TiO₂ | 0.2298 | |
| 6 | SiO₂ | 0.2401 | |
| 7 | TiO₂ | 0.2654 | } ≧(QUARTER-WAVE) |
| 8 | SiO₂ | 0.2724 | |
| 9 | TiO₂ | 0.2799 | |
| 10 | SiO₂ | 0.2942 | |
| 11 | TiO₂ | 0.3172 | |
| 12 | SiO₂ | 0.3240 | |
| 13 | TiO₂ | 0.3341 | |
| 14 | SiO₂ | 0.3340 | |
| 15 | TiO₂ | 0.3331 | |
| 16 | SiO₂ | 0.3193 | |
| 17 | TiO₂ | 0.3004 | |
| 18 | SiO₂ | 0.1455 | ≦(QUARTER-WAVE) |

(SECOND EMBODIMENT)

Fig.4

⟨20 LAYERS( λ =750nm)⟩

| LAYER | MATERIAL | OPTICAL THICKNESS | |
|---|---|---|---|
| 1 | TiO$_2$ | 0.2726 | } ≧(QUARTER-WAVE) |
| 2 | SiO$_2$ | 0.2567 | |
| 3 | TiO$_2$ | 0.2203 | |
| 4 | SiO$_2$ | 0.2370 | |
| 5 | TiO$_2$ | 0.2197 | } ≦(QUARTER-WAVE) |
| 6 | SiO$_2$ | 0.2404 | |
| 7 | TiO$_2$ | 0.2462 | |
| 8 | SiO$_2$ | 0.2786 | |
| 9 | TiO$_2$ | 0.2838 | |
| 10 | SiO$_2$ | 0.2773 | |
| 11 | TiO$_2$ | 0.2998 | |
| 12 | SiO$_2$ | 0.3232 | |
| 13 | TiO$_2$ | 0.3159 | } ≧(QUARTER-WAVE) |
| 14 | SiO$_2$ | 0.3300 | |
| 15 | TiO$_2$ | 0.3352 | |
| 16 | SiO$_2$ | 0.3349 | |
| 17 | TiO$_2$ | 0.3397 | |
| 18 | SiO$_2$ | 0.3162 | |
| 19 | TiO$_2$ | 0.3105 | |
| 20 | SiO$_2$ | 0.1527 | ≦(QUARTER-WAVE) |

(THIRD EMBODIMENT)

Fig.5

⟨22 LAYERS(λ =750nm)⟩

| LAYER | MATERIAL | OPTICAL THICKNESS | |
|---|---|---|---|
| 1 | TiO₂ | 0.2695 | } ≧(QUARTER-WAVE) |
| 2 | SiO₂ | 0.2561 | |
| 3 | TiO₂ | 0.2167 | } ≦(QUARTER-WAVE) |
| 4 | SiO₂ | 0.2351 | |
| 5 | TiO₂ | 0.2204 | |
| 6 | SiO₂ | 0.2435 | |
| 7 | TiO₂ | 0.2525 | } ≧(QUARTER-WAVE) |
| 8 | SiO₂ | 0.2749 | |
| 9 | TiO₂ | 0.2767 | |
| 10 | SiO₂ | 0.2727 | |
| 11 | TiO₂ | 0.2985 | |
| 12 | SiO₂ | 0.3100 | |
| 13 | TiO₂ | 0.3108 | |
| 14 | SiO₂ | 0.3245 | |
| 15 | TiO₂ | 0.3221 | |
| 16 | SiO₂ | 0.3241 | |
| 17 | TiO₂ | 0.3424 | |
| 18 | SiO₂ | 0.3321 | |
| 19 | TiO₂ | 0.3393 | |
| 20 | SiO₂ | 0.3227 | |
| 21 | TiO₂ | 0.3095 | |
| 22 | SiO₂ | 0.1551 | ≦(QUARTER-WAVE) |

(FOURTH EMBODIMENT)

Fig.6

⟨24 LAYERS (λ =750nm)⟩

| LAYER | MATERIAL | OPTICAL THICKNESS | |
|---|---|---|---|
| 1 | TiO₂ | 0.2711 | ≧(QUARTER-WAVE) |
| 2 | SiO₂ | 0.2559 | |
| 3 | TiO₂ | 0.2103 | ≦(QUARTER-WAVE) |
| 4 | SiO₂ | 0.2362 | |
| 5 | TiO₂ | 0.2230 | |
| 6 | SiO₂ | 0.2417 | |
| 7 | TiO₂ | 0.2560 | ≧(QUARTER-WAVE) |
| 8 | SiO₂ | 0.2686 | |
| 9 | TiO₂ | 0.2732 | |
| 10 | SiO₂ | 0.2685 | |
| 11 | TiO₂ | 0.2894 | |
| 12 | SiO₂ | 0.3020 | |
| 13 | TiO₂ | 0.3027 | |
| 14 | SiO₂ | 0.3210 | |
| 15 | TiO₂ | 0.3258 | |
| 16 | SiO₂ | 0.3229 | |
| 17 | TiO₂ | 0.3337 | |
| 18 | SiO₂ | 0.3264 | |
| 19 | TiO₂ | 0.3449 | |
| 20 | SiO₂ | 0.3411 | |
| 21 | TiO₂ | 0.3417 | |
| 22 | SiO₂ | 0.3203 | |
| 23 | TiO₂ | 0.3067 | |
| 24 | SiO₂ | 0.1517 | ≦(QUARTER-WAVE) |

(FIFTH EMBODIMENT)

Fig.7

⟨26 LAYERS(λ=750nm)⟩

| LAYER | MATERIAL | OPTICAL THICKNESS | |
|---|---|---|---|
| 1 | TiO$_2$ | 0.2680 | } ≧(QUARTER-WAVE) |
| 2 | SiO$_2$ | 0.2560 | |
| 3 | TiO$_2$ | 0.2139 | } ≦(QUARTER-WAVE) |
| 4 | SiO$_2$ | 0.2257 | |
| 5 | TiO$_2$ | 0.2308 | |
| 6 | SiO$_2$ | 0.2377 | |
| 7 | TiO$_2$ | 0.2593 | } ≧(QUARTER-WAVE) |
| 8 | SiO$_2$ | 0.2591 | |
| 9 | TiO$_2$ | 0.2655 | |
| 10 | SiO$_2$ | 0.2604 | |
| 11 | TiO$_2$ | 0.2724 | |
| 12 | SiO$_2$ | 0.2812 | |
| 13 | TiO$_2$ | 0.2832 | |
| 14 | SiO$_2$ | 0.2958 | |
| 15 | TiO$_2$ | 0.3152 | |
| 16 | SiO$_2$ | 0.3221 | |
| 17 | TiO$_2$ | 0.3297 | |
| 18 | SiO$_2$ | 0.3277 | |
| 19 | TiO$_2$ | 0.3277 | |
| 20 | SiO$_2$ | 0.3320 | |
| 21 | TiO$_2$ | 0.3433 | |
| 22 | SiO$_2$ | 0.3362 | |
| 23 | TiO$_2$ | 0.3322 | |
| 24 | SiO$_2$ | 0.3119 | |
| 25 | TiO$_2$ | 0.3010 | |
| 26 | SiO$_2$ | 0.1480 | ≦(QUARTER-WAVE) |

(SIXTH EMBODIMENT)

Fig.9

⟨18 LAYERS(λ=750nm)⟩

| LAYER | MATERIAL | OPTICAL THICKNESS | |
|---|---|---|---|
| 1 | TiO$_2$ | 0.256 | } ≧(QUARTER-WAVE) |
| 2 | MgF$_2$ | 0.260 | |
| 3 | TiO$_2$ | 0.228 | } ≦(QUARTER-WAVE) |
| 4 | MgF$_2$ | 0.227 | |
| 5 | TiO$_2$ | 0.238 | |
| 6 | MgF$_2$ | 0.233 | |
| 7 | TiO$_2$ | 0.263 | } ≧(QUARTER-WAVE) |
| 8 | MgF$_2$ | 0.269 | |
| 9 | TiO$_2$ | 0.279 | |
| 10 | MgF$_2$ | 0.281 | |
| 11 | TiO$_2$ | 0.314 | |
| 12 | MgF$_2$ | 0.321 | |
| 13 | TiO$_2$ | 0.337 | |
| 14 | MgF$_2$ | 0.324 | |
| 15 | TiO$_2$ | 0.318 | |
| 16 | MgF$_2$ | 0.317 | |
| 17 | TiO$_2$ | 0.314 | |
| 18 | MgF$_2$ | 0.157 | ≦(QUARTER-WAVE) |

(SEVENTH EMBODIMENT)

Fig.10

⟨20 LAYERS (λ =750nm)⟩

| LAYER | MATERIAL | OPTICAL THICKNESS | |
|---|---|---|---|
| 1 | TiO₂ | 0.277 | ≧(QUARTER-WAVE) |
| 2 | MgF₂ | 0.257 | |
| 3 | TiO₂ | 0.218 | ≦(QUARTER-WAVE) |
| 4 | MgF₂ | 0.239 | |
| 5 | TiO₂ | 0.228 | |
| 6 | MgF₂ | 0.238 | |
| 7 | TiO₂ | 0.265 | ≧(QUARTER-WAVE) |
| 8 | MgF₂ | 0.277 | |
| 9 | TiO₂ | 0.273 | |
| 10 | MgF₂ | 0.275 | |
| 11 | TiO₂ | 0.293 | |
| 12 | MgF₂ | 0.302 | |
| 13 | TiO₂ | 0.302 | |
| 14 | MgF₂ | 0.322 | |
| 15 | TiO₂ | 0.330 | |
| 16 | MgF₂ | 0.331 | |
| 17 | TiO₂ | 0.327 | |
| 18 | MgF₂ | 0.317 | |
| 19 | TiO₂ | 0.317 | |
| 20 | MgF₂ | 0.156 | ≦(QUARTER-WAVE) |

(EIGHTH EMBODIMENT)

Fig.13

⟨21 LAYERS($\lambda$ =750nm)⟩

| LAYER | MATERIAL | OPTICAL THICKNESS | |
|---|---|---|---|
|  | $Al_2O_3$ | 0.1323 | |
| 1 | $TiO_2$ | 0.2570 | } ≧(QUARTER-WAVE) |
| 2 | $SiO_2$ | 0.2501 | |
| 3 | $TiO_2$ | 0.2235 | } ≦(QUARTER-WAVE) |
| 4 | $SiO_2$ | 0.2258 | |
| 5 | $TiO_2$ | 0.2344 | |
| 6 | $SiO_2$ | 0.2370 | |
| 7 | $TiO_2$ | 0.2588 | } ≧(QUARTER-WAVE) |
| 8 | $SiO_2$ | 0.2639 | |
| 9 | $TiO_2$ | 0.2788 | |
| 10 | $SiO_2$ | 0.2819 | |
| 11 | $TiO_2$ | 0.3026 | |
| 12 | $SiO_2$ | 0.3109 | |
| 13 | $TiO_2$ | 0.3209 | |
| 14 | $SiO_2$ | 0.3240 | |
| 15 | $TiO_2$ | 0.3320 | |
| 16 | $SiO_2$ | 0.3304 | |
| 17 | $TiO_2$ | 0.3399 | |
| 18 | $SiO_2$ | 0.3214 | |
| 19 | $TiO_2$ | 0.3115 | |
| 20 | $SiO_2$ | 0.1515 | ≦(QUARTER-WAVE) |

(NINTH EMBODIMENT)

INFRARED RAY CUT FILTER AND METHODS FOR MANUFACTURING THE SAME

BACKGROUND OF THE INVENTION

1. Field of the Invention

The present invention relates to an infrared ray cut filter used in an imaging apparatus that includes solid imaging elements and the like and to a manufacturing method therefore, and relates more specifically to an reflective-type infrared ray cut filter that uses a multilayer optical membrane.

2. Description of the Related Art

While human vision lacks sufficient optical sensitivity to perceive infrared light, i.e., light having a wavelength above approximately 700 nanometers (nm), a CCD (charge coupled device) has a sensitivity that enables it to perceive infrared light up to a wavelength of about 1100 nm. As a result, an infrared ray cut filter is used in an imaging apparatus that employs solid imaging elements such as CCDs. An infrared ray cut filter has the characteristic of blocking infrared light while allowing visible light to pass through. Consequently, the imaging apparatus can obtain images with an optical sensitivity close to that of human beings while blocking infrared light from CCDs or other devices.

Infrared ray cut filters include absorption-type and reflection-type filters. In an absorption-type infrared ray cut filter, infrared-absorbing metal ions are contained in glass. An absorption-type filter exhibits gradually decreasing light permeability as the light wavelength increases from 550 nm to 750 nm. This light permeability characteristic permits natural color reproduction with a sensitivity characteristic close to that of human vision, but in order to obtain good light permeability, the glass must have a prescribed minimum thickness. As a result, it is difficult to make the imaging apparatus small in size.

In a reflection-type infrared ray cut filter, on the other hand, a multilayer optical membrane that reflects infrared light is formed on glass. Because this type of filter can be realized by applying a multilayer optical membrane coating over an optical member incorporated in the imaging apparatus, and also because the multilayer membrane is thin, it is easy to make the imaging apparatus compact. However, the light permeability of a typical multilayer optical membrane filter decreases sharply between the permeable light range and the non-permeable light range. As a result, it is difficult to achieve natural color reproduction that closely reflects the sensitivity characteristic of human vision.

A reflection-type infrared ray cut filter that eliminates the above-mentioned light permeability problem is known in the conventional art. By forming the multilayer optical membrane to include at least 34 layers each having a prescribed optical thickness, light permeability is made to decrease gradually as the wavelength increases from 550 nm to 750 nm, in the same fashion as an absorption-type infrared ray cut filter. This technology is described in, for example, Japanese Laid-Open Patent No. 2000-314808.

However, this type of reflective-type infrared ray cut filter must constitute a multilayer optical membrane composed of at least 34 thin membrane layers. Consequently, variations in optical thickness that occur when the various thin membrane layers are formed have a significant effect on the light permeability of the multilayer optical membrane as a whole, making it difficult to manufacture a product with stable light permeability. As a result, it is costly and time-consuming to manufacture this type of infrared ray cut filter.

The present invention was created in view of the foregoing, and an object thereof is to provide a reflection-type infrared ray cut filter and associated manufacturing method that can reduce the cost and time required for manufacture and increase manufacturing efficiency.

SUMMARY OF THE INVENTION

In order to achieve the above object, the infrared ray cut filter of the present invention is an infrared ray cut filter comprising: a transparent substrate; and a multilayer membrane including multiple high-refractive index thin membranes of a high-refractive index material and multiple low-refractive index thin membranes of a low-refractive index material, which are laid on said transparent substrate in an alternating fashion, said multilayer membrane having thin membrane layers of no less than 16 but no more than 32, wherein: the first layer of said multilayer membrane from a side of said transparent substrate is one of said high-refractive index thin membranes and is formed to have an optical thickness of no less than $\lambda/4$; the second layer of said multilayer membrane is formed to have an optical thickness of no less than $\lambda/4$; each layer from the third layer through a prescribed layer of said multilayer membrane is formed to have an optical thickness of no more than $\lambda/4$; each layer between said prescribed layer and the last layer of said multilayer membrane is formed to have an optical thickness of no less than $\lambda/4$; and said last layer is one of said low-refractive index thin membranes and is formed to have an optical thickness of no more than $\lambda/4$, where $\lambda$ represents design wavelength.

Using this infrared ray cut filter, a gradually decreasing light permeability characteristic as the wavelength increases from 550 nm to 750 nm can be achieved by employing a multilayer optical membrane having no less than 16 but no more than 32 layers. As a result, the effect of variations in the optical thickness of the thin membrane layers during formation thereof on the light permeability [of the multilayer membrane as a whole] can be reduced in comparison with the conventional infrared ray cut filter having 34 or more layers. As a result, the difficulty of manufacturing a stable product can be mitigated, allowing the time and cost involved in manufacture of the infrared ray cut filter to be reduced and increasing manufacturing efficiency.

The infrared ray cut filter of the present invention having the above construction can also have the constructions described below. The prescribed layer may be the sixth or seventh layer of the multilayer membrane from the side of the transparent substrate. According to this type of infrared ray cut filter, a light permeability characteristic closer to that of human vision can be obtained.

Furthermore, a medium-refractive index thin membrane composed of a medium-refractive index material may be disposed between the transparent substrate and the multilayer membrane. According to this type of infrared ray cut filter, because the multilayer membrane can be easily removed from the transparent substrate using a remover, the membrane can be easily re-formed even in the event of a defect in the formation of the multilayer membrane. Moreover, the adhesion between the transparent substrate and the multilayer membrane can be increased. Furthermore, fluctuations in light permeability within the visible light range due to a difference in the refractive indices of the transparent substrate and the first high-refractive index thin membrane layer can be prevented.

The high-refractive index thin membrane layers may be made from $TiO_2$, while the low-refractive index thin membrane layers may be made from $SiO_2$ or $MgF_2$. The medium-refractive index thin membrane may be made from $Al_2O_3$. The techniques for forming a membrane using these materials are widely known and implemented in the conventional art. As a result, manufacturing can be performed using existing equipment without the need for special forming technology.

The manufacturing method for the infrared ray cut filter of the present invention is a manufacturing method for an infrared ray cut filter comprising a transparent substrate and a multilayer membrane including multiple high-refractive index thin membranes of a high-refractive index material and multiple low-refractive index thin membranes of a low-refractive index material, said multilayer membrane having thin membrane layers of no less than 16 but no more than 32, the method comprising the steps of forming a first layer in the first position on said transparent substrate with said high-refractive index material and to have an optical thickness of no less than $\lambda/4$; forming a second layer in the second position on said transparent substrate with said low-refractive index material and to have an optical thickness of no less than $\lambda/4$; forming plural layers from a third layer through a prescribed layer with said high-refractive index material and said low-refractive index material which are laid in an alternating fashion and each layer to have an optical thickness of no more than $\lambda/4$; forming plural layers between said prescribed layer and a last layer in the last position on said transparent substrate with said high-refractive index material and said low-refractive index material which are laid in an alternating fashion and each layer to have an optical thickness of no less than $\lambda/4$; and forming said last layer with said low-refractive index material and to have an optical thickness of no more than $\lambda/4$, where $\lambda$ represents design wavelength.

According to this manufacturing method for an infrared ray cut filter, an infrared ray cut filter having a gradually decreasing light permeability characteristic as the wavelength increases from 550 nm to 750 nm can be manufactured by forming a multilayer membrane having no less than 16 but no more than 32 layers. Consequently, the effect of variations in the optical thickness of the thin membrane layers during formation thereof on the light permeability [of the multilayer membrane as a whole] can be reduced in comparison with the conventional infrared ray cut filter having 34 or more layers. As a result, the difficulty of manufacturing a stable product can be mitigated, thereby allowing the time and cost involved in manufacture of the infrared ray cut filter to be reduced and increasing manufacturing efficiency.

BRIEF DESCRIPTION OF THE DRAWINGS

FIG. 2 shows one example of the optical thicknesses of the thin membrane layers comprising a 16-layer multilayer membrane 200 of the first embodiment;

FIG. 3 shows one example of the optical thicknesses of the thin membrane layers comprising an 18-layer multilayer membrane 200 of a second embodiment;

FIG. 4 shows one example of the optical thicknesses of the thin membrane layers comprising a 20-layer multilayer membrane 200 of a third embodiment;

FIG. 5 shows one example of the optical thicknesses of the thin membrane layers comprising a 22-layer multilayer membrane 200 of a fourth embodiment;

FIG. 6 shows one example of the optical thicknesses of the thin membrane layers comprising a 24-layer multilayer membrane 200 of a fifth embodiment;

FIG. 7 shows one example of the optical thicknesses of the thin membrane layers comprising a 26-layer multilayer membrane 200 of a sixth embodiment;

FIG. 9 shows one example of the optical thicknesses of the thin membrane layers comprising an 18-layer multilayer membrane 200 of a seventh embodiment;

FIG. 10 shows one example of the optical thicknesses of the thin membrane layers comprising a 20-layer multilayer membrane 200 of an eighth embodiment;

FIG. 13 shows one example of the optical thicknesses of the thin membrane layers comprising the one-layer medium-refractive index thin membrane 300 and 20-layer multilayer membrane 200 of the ninth embodiment;

DESCRIPTION OF THE PREFERRED EMBODIMENTS

In order to further clarify the construction and operation of the present invention described above, embodiments of the infrared ray cut filter that employs the present invention will be described below.

Figure 1:
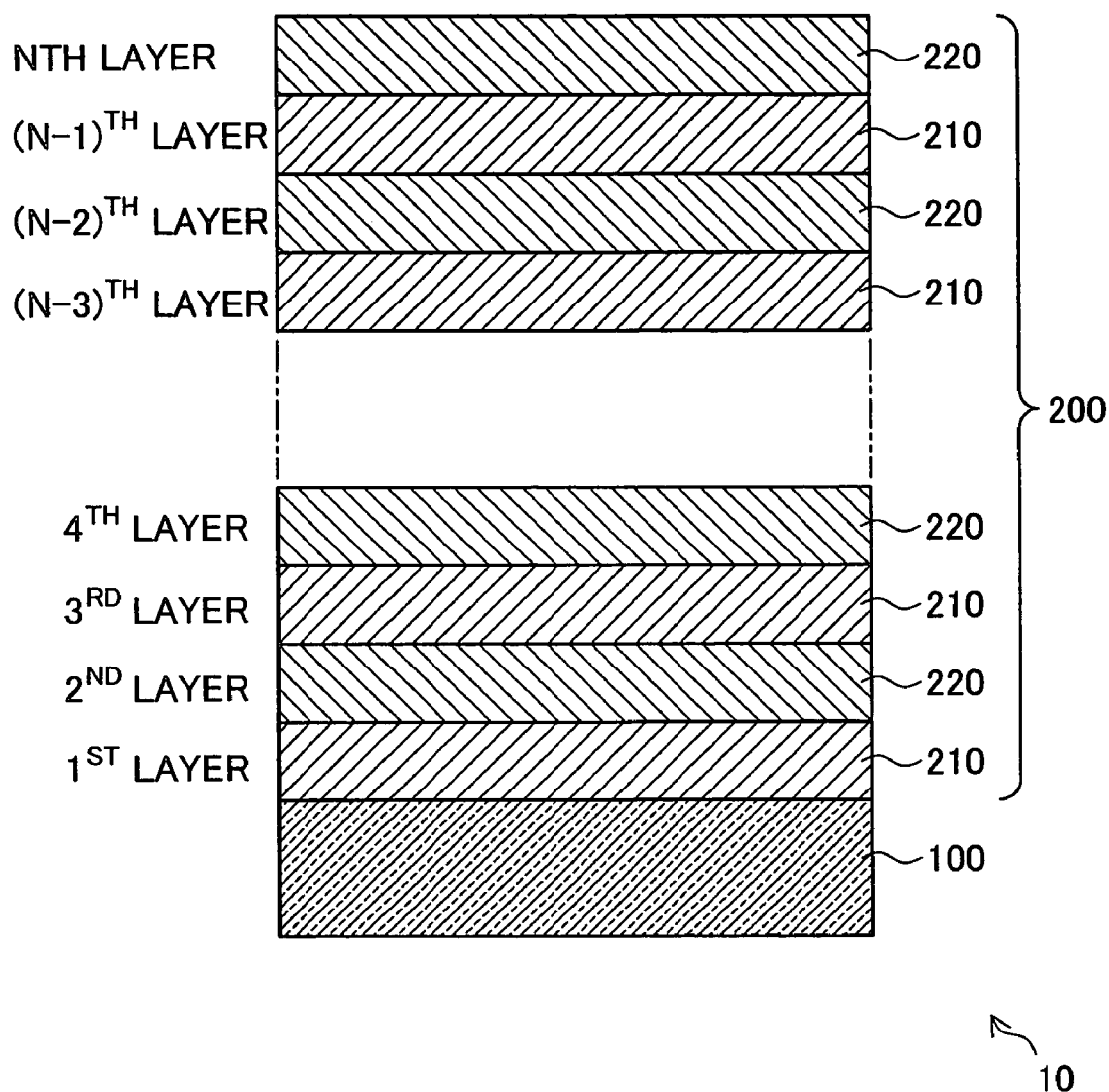
FIG. 1 shows the basic construction of the infrared ray cut filters of the first through sixth embodiments of the present invention.

First, the infrared ray cut filters 10 of the first through sixth embodiments comprising one aspect of the present invention will be described. FIG. 1 is an explanatory drawing showing the basic construction of the infrared ray cut filters 10 of the first through sixth embodiments. An infrared ray cut filter 10 is composed by forming a multilayer membrane 200 composed of multiple layers of a high-refractive index thin membrane 210 made of a high-refractive index material and a low-refractive index thin membrane 210 made of a low-refractive index material that are laminated in an alternating fashion on a glass substrate 100. This multilayer membrane 200 is composed of no less than 16 but no more than 26 of these thin membranes. The first layer of the multilayer membrane 200 from the side of the glass substrate 100 is a high-refractive index thin membrane layer 210, while, the last layer (the $n^{th}$ layer shown in FIG. 1) is a low-refractive index thin membrane layer 220. In other words, the multilayer membrane 200 is composed of an even number of no less than 16 but no more than 32 layers, and among these layers, the even-numbered layers are high-refractive index thin membranes 210 and the odd-numbered layers are low-refractive index thin membranes 220. In the description below, the thin membrane layers that comprise the multilayer membrane 200 are referred to sequentially as the 'first', 'second', etc. layer up to the 'last' layer from the side of the glass substrate 100.

The glass substrate 100 is made of transparent crystal. This glass substrate 100 may also constitute an optical component such as an optical low-pass filter. Titanium dioxide (TiO$_2$) is used for the high-refractive index thin membranes 210 as a high-refractive index material. Silicon dioxide (SiO$_2$) is used as the low-refractive index material in the low-refractive index thin membranes 220.

The optical thicknesses of the various thin membranes comprising the multilayer membrane 200 in the first through sixth embodiments will now be described. FIG. 2 is shows one example of the optical thicknesses of the thin membrane layers comprising a 16-layer multilayer membrane 200 of the first embodiment. FIG. 3 also shows the second embodiment with an 18-layer multilayer membrane 200. FIG. 4 also shows the third embodiment with a 20-layer multilayer membrane 200. FIG. 5 also shows the fourth embodiment with a 22-layer multilayer membrane 200. FIG. 6 also shows the fifth embodiment with a 24-layer multilayer membrane 200. FIG. 7 also shows the sixth embodiment with a 26-layer multilayer membrane 200. In FIGS. 2 through 7, for each thin membrane layer comprising the multilayer membrane 200, 'layer', 'material' and 'optical thickness' are shown. The value for the 'optical thickness' parameter indicates the optical thickness of the layer where the wavelength of the light within each layer is deemed '1'.

The thin membranes comprising the multilayer membrane 200 shown in FIGS. 2 through 7 are formed with optical thicknesses of approximately $\lambda/4$, based on a design wavelength $\lambda$ of 750 nm. The first and second layers of the multilayer membrane 200 are formed with optical thicknesses of $\lambda/4$ or higher. Layers from the third layer to a prescribed layer are formed with optical thicknesses of $\lambda/4$ or lower. This prescribed layer is the $7^{th}$ layer in the 20-layer multilayer membrane 200 of the third embodiment shown in FIG. 4, and the $6^{th}$ layer in the multilayer membrane 200 of all embodiments other than the third embodiment. The layers between this prescribed layer and the last layer are formed with optical thicknesses of $\lambda/4$ or higher. The last layer is formed with an optical thickness of $\lambda/4$ or lower. The physical thickness of each layer is expressed as {design wavelength $\lambda$}×{optical thickness}/{refractive index of thin membrane material}. Here, the refractive index of titanium dioxide (TiO$_2$) is known to be 'approximately 2.3' and the refractive index of silicon dioxide (SiO$_2$) is known to be 'approximately 1.46'.

Figure 8:
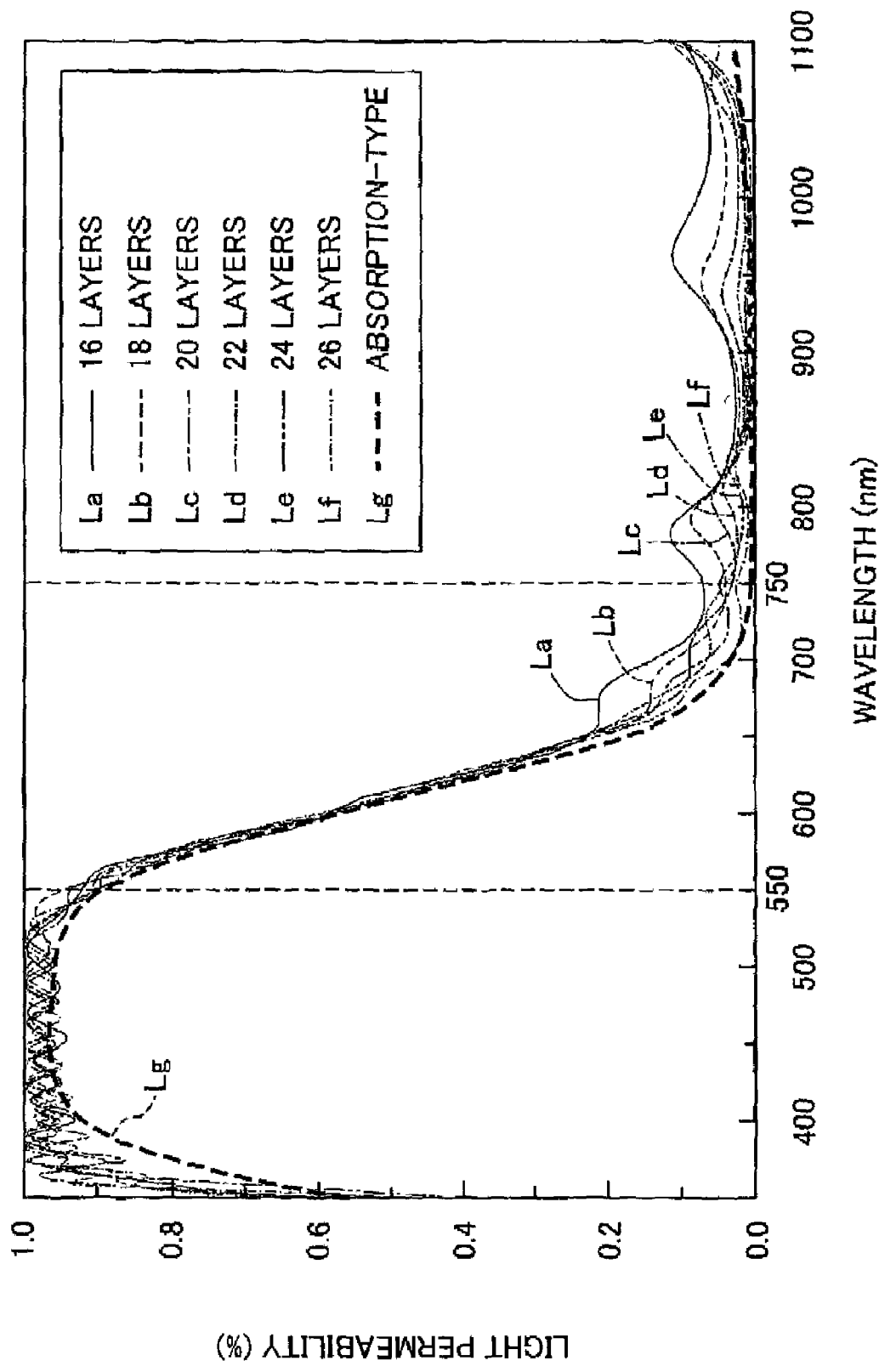
FIG. 8 shows the respective light permeability characteristics of the various infrared ray cut filters 10 that include the multilayer membranes 200 described in the first through sixth embodiments.

The light permeability characteristic of the infrared ray cut filters 10 of the first through sixth embodiments will now be described. FIG. 8 is an explanatory drawing showing the respective light permeability characteristics of the various infrared ray cut filters 10 that include the multilayer membranes 200 of the first through sixth embodiments. In FIG. 8, the light wavelength is shown on the horizontal axis and the light permeability is shown on the vertical axis. The curves La through Lf in FIG. 8 show the respective light permeability characteristics of the infrared ray cut filters 10 that include the multilayer membranes 200 shown in FIGS. 2 through 7. The curve Lg in FIG. 8 shows the light permeability characteristic of an absorption-type infrared ray cut filter. In other words, the curve Lg shows the ideal light permeability characteristic for natural color reproduction approaching the sensitivity of human vision.

As shown in FIG. 8, the light permeability characteristics of the respective infrared ray cut filters 10 exhibit a light permeability of at least 90% for light in the wavelength band of 400–550 nm. Light permeability decreases gradually in the wavelength band of 550–750 nm, and falls to 10% or lower in the wavelength band of 750–1050 nm. Accordingly, the respective light permeability characteristics La through Lf of the infrared ray cut filters 10 of the first through sixth embodiments are essentially identical to the light permeability characteristic Lg of the absorption-type infrared ray cut filter. As is clear from FIG. 8, as the number of thin membrane layers in the multilayer membrane 200 increases, the degree of fluctuation in the light permeability characteristic decreases.

According to the infrared ray cut filters 10 of the first through sixth embodiments described above, a light permeability characteristic wherein light permeability decreases gradually as the wavelength increases from 550 nm to 750 nm can be attained using a multilayer membrane 200 having no less than 16 but no more than 26 layers. Consequently, the effect on the light permeability characteristic of variations in the optical thicknesses of the thin membrane layers during membrane formation can be reduced in comparison with the conventional infrared ray cut filter having 34 or more layers. As a result, the difficulty of manufacturing a stable product can be mitigated, thereby allowing the time and cost involved in manufacture of the infrared ray cut filter to be reduced and increasing manufacturing efficiency. The first through sixth embodiments showed a multilayer membrane 200 having between no more than 16 but no less than 26 layers, but the same light permeability characteristic can be achieved with a multilayer membrane 200 having no less than 28 but no more than 32 layers. Furthermore, the optical thickness values for the various layers are not limited to the values described in FIGS. 2 through 7 above, and can be freely changed within the membrane thickness condition described above in view of the desired light permeability characteristic and manufacturing efficiency.

The infrared ray cut filters 10 of the seventh and eighth embodiments will now be described. The infrared ray cut filters 10 of the seventh and eighth embodiments differ from the second and third embodiments in that magnesium fluoride (MgF$_2$) is used as the low-refractive index material in the low-refractive index thin membranes 220, but is identical in all other aspects. The basic construction of the infrared ray cut filters 10 of the seventh and eighth embodiments is as shown in FIG. 1 above. Titanium dioxide (TiO$_2$) is used in the high-refractive index thin membranes 210 as a high-refractive index material. Magnesium fluoride (MgF$_2$) is used as the low-refractive index material in the low-refractive index thin membranes 220 in place of silicon dioxide (SiO$_2$).

The optical thicknesses of the various thin membranes that comprise the multilayer membranes 200 of the seventh and eighth embodiments will now be described. FIG. 9 is an explanatory drawing showing one example of the optical thicknesses of the thin membranes comprising an 18-layer multilayer membrane 200 of the seventh embodiment. FIG. 10 is an explanatory drawing showing one example of the optical thicknesses of the thin membranes comprising a 20-layer multilayer membrane 200 of the eighth embodiment. In FIGS. 9 and 10, for each thin membrane layer comprising the multilayer membrane 200, 'layer', 'material' and 'optical thickness' are shown. The value for the 'optical thickness' parameter indicates the thickness of the layer where the wavelength of the light within each layer is deemed '1'.

The thin membranes comprising the multilayer membranes 200 shown in FIGS. 9 and 10 are formed with optical thicknesses of approximately $\lambda/4$, based on a design wavelength $\lambda$ of 750 nm. The first and second layers of the multilayer membranes 200 are formed with optical thicknesses of $\lambda/4$ or higher. The third through sixth layers are formed with optical thicknesses of λ/4 or lower. The layers between the sixth and the last layers are formed with optical thicknesses of λ/4 or higher. The last layer is formed with an optical thickness of λ/4 or lower. The physical thickness of each layer is expressed as {design wavelength λ}×{optical thickness}/{refractive index of thin membrane material}. Here, the refractive index of titanium dioxide ($TiO_2$) is known to be 'approximately 2.3' and the refractive index of magnesium fluoride ($MgF_2$) is known to be 'approximately 1.38'.

Figure 11:
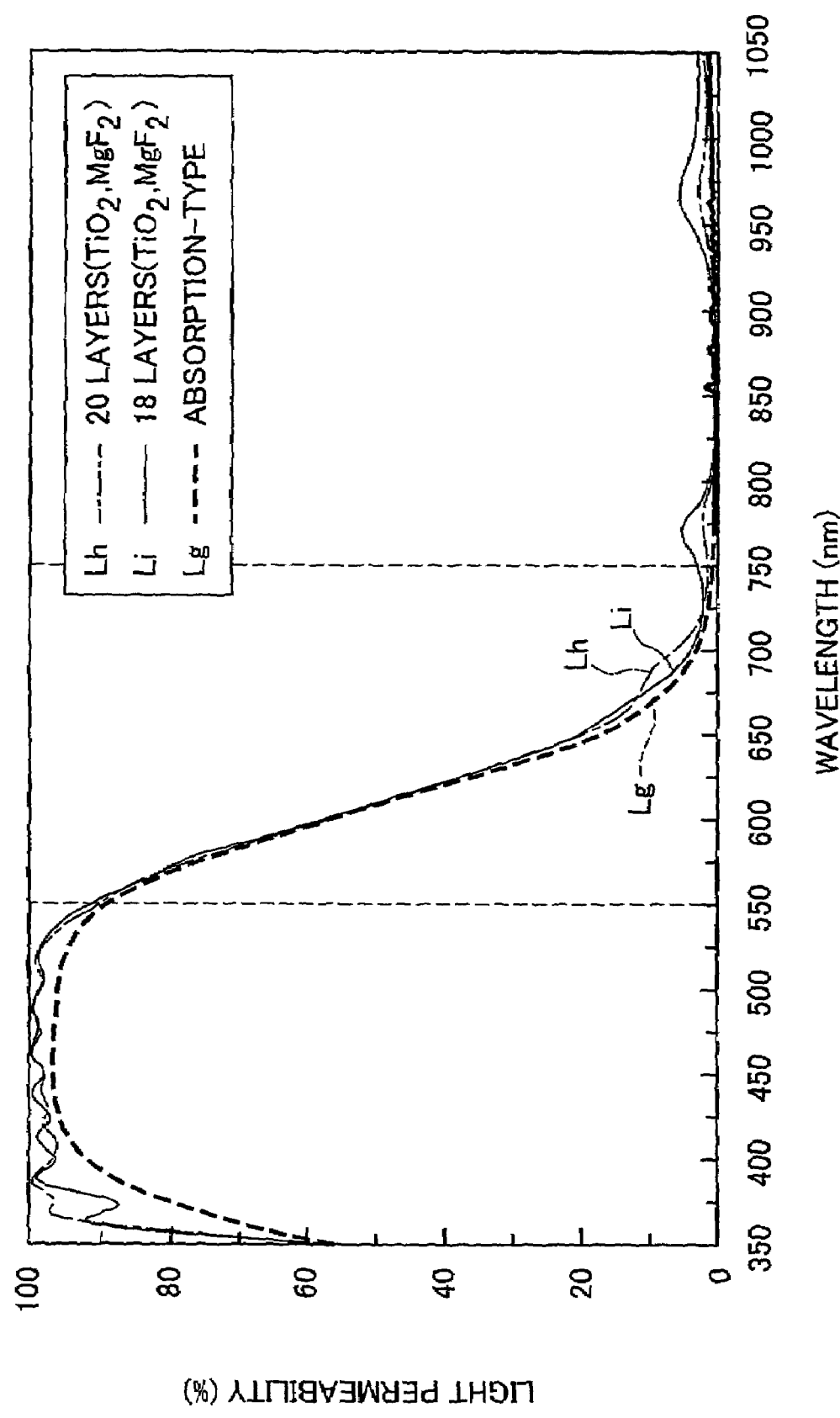
FIG. 11 shows the respective light permeability characteristics of the various infrared ray cut filters 10 that include the multilayer membranes 200 described in the seventh and eighth embodiments.

The light permeability characteristics of the infrared ray cut filters 10 of the seventh and eighth embodiments will now be described. FIG. 11 is an explanatory drawing showing the respective light permeability characteristics of the infrared ray cut filters 10 that include the multilayer membranes 200 of the seventh and eighth embodiments. In FIG. 11, the light wavelength is shown on the horizontal axis and the light permeability is shown on the vertical axis. The curve Lh in FIG. 11 shows the light permeability characteristic of the infrared ray cut filter 10 that includes the multilayer membrane 200 of the seventh embodiment shown in FIG. 9. The curve Li in FIG. 11 shows the light permeability characteristic of the infrared ray cut filter 10 that includes the multilayer membrane 200 of the eighth embodiment shown in FIG. 10. The curve Lg in FIG. 11 shows the light permeability characteristic of an absorption-type infrared ray cut filter.

As shown in FIG. 11, the light permeability characteristics of the respective infrared ray cut filters 10 of the seventh and eighth embodiments exhibit a light permeability of at least 90% for light in the wavelength band of 400–550 nm. Light permeability decreases gradually in the wavelength band of 550–750 nm, and falls to 10% or lower in the wavelength band of 750–1050 nm. Accordingly, the respective light permeability characteristics Lh and Li of the infrared ray cut filters 10 of the seventh and eighth embodiments are essentially identical to the light permeability characteristic Lg of the absorption-type infrared ray cut filter.

According to the infrared ray cut filters 10 of the seventh and eighth embodiments described above, a light permeability characteristic equivalent to that obtained with the first through sixth embodiments can be achieved. While the seventh and eighth embodiments involved a multilayer membrane 200 composed of 18 or 20 layers, respectively, the same light permeability characteristic can be achieved using a multilayer membrane 200 composed of 16 layers or no less than 22 but no more than 32 layers as well. Moreover, the optical thickness values for the various layers are not limited to the values described in FIGS. 9 and 10, and can be freely changed within the membrane thickness condition described above in view of the desired light permeability characteristic and manufacturing efficiency.

Figure 12:
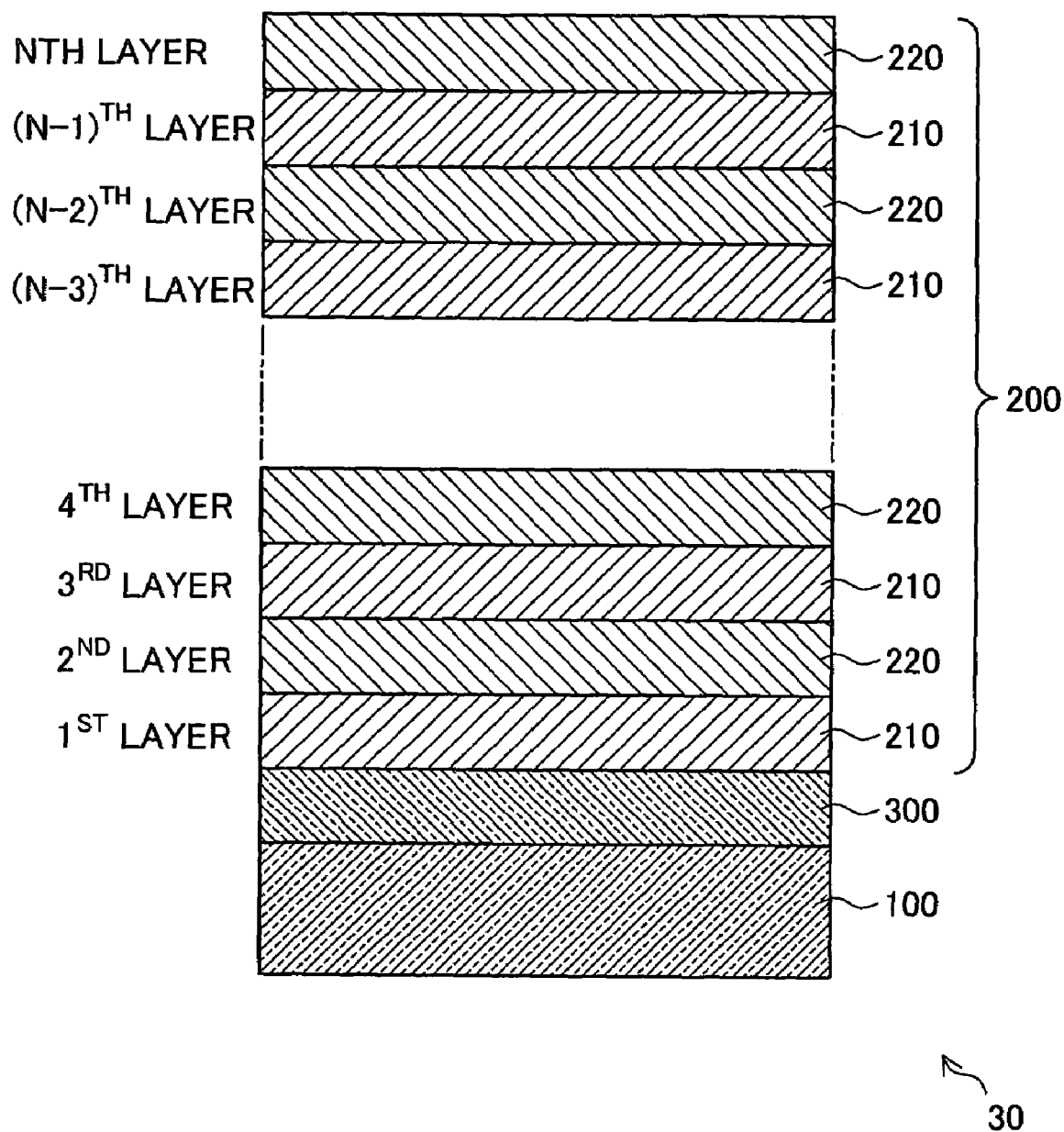
FIG. 12 shows the basic construction of an infrared ray cut filter 30 of a ninth embodiment.

The infrared ray cut filter 30 of the ninth embodiment will now be described. FIG. 12 is an explanatory drawing showing the basic construction of the infrared ray cut filter 30 of the ninth embodiment. The infrared ray cut filter 30 of the ninth embodiment differs from the infrared ray cut filter 10 of the third embodiment in that a medium-refractive index thin membrane 300 made of a medium-refractive index material is disposed between the glass substrate 100 and the multilayer membrane 200, but is identical in all other aspects. Aluminum oxide ($Al_2O_3$) is used as the medium-refractive index material in the medium-refractive index thin membrane 300.

The optical thicknesses of the various thin membranes that comprise the multilayer membrane 200 of the ninth embodiment will now be described. FIG. 13 is an explanatory drawing showing one example of the optical thicknesses of the thin membranes comprising the one-layer medium-refractive index thin membrane 300 and 20-layer multilayer membrane 200 of the ninth embodiment. In FIG. 13, for each thin membrane layer comprising the multilayer membrane 200, 'layer', 'material' and 'optical thickness' are shown. The value for the 'optical thickness' parameter indicates the thickness of the layer where the wavelength of the light within each layer is deemed '1'.

The thin membranes comprising the multilayer membrane 200 shown in FIG. 13 are formed with optical thicknesses of approximately λ/4, based on a design wavelength λ of 750 nm. The medium-refractive index thin membrane 300 is formed with an optical thickness of λ/4 or lower. The first and second layers of the multilayer membrane 200 are formed with optical thicknesses of λ/4 or higher. The third through sixth layers are formed with optical thicknesses of λ/4 or lower. The layers between the sixth and the last layers are formed with optical thicknesses of λ/4 or higher. The last layer is formed with an optical thickness of λ/4 or lower. The physical thickness of each layer is expressed as {design wavelength λ}×{optical thickness}/{refractive index of thin membrane material}. Here, the refractive index of titanium dioxide ($TiO_2$) is known to be 'approximately 2.3', the refractive index of silicon dioxide ($SiO_2$) is known to be 'approximately 1.46', and the refractive index of aluminum oxide ($Al_2O_3$) is known to be 'approximately 1.64'.

Figure 14:
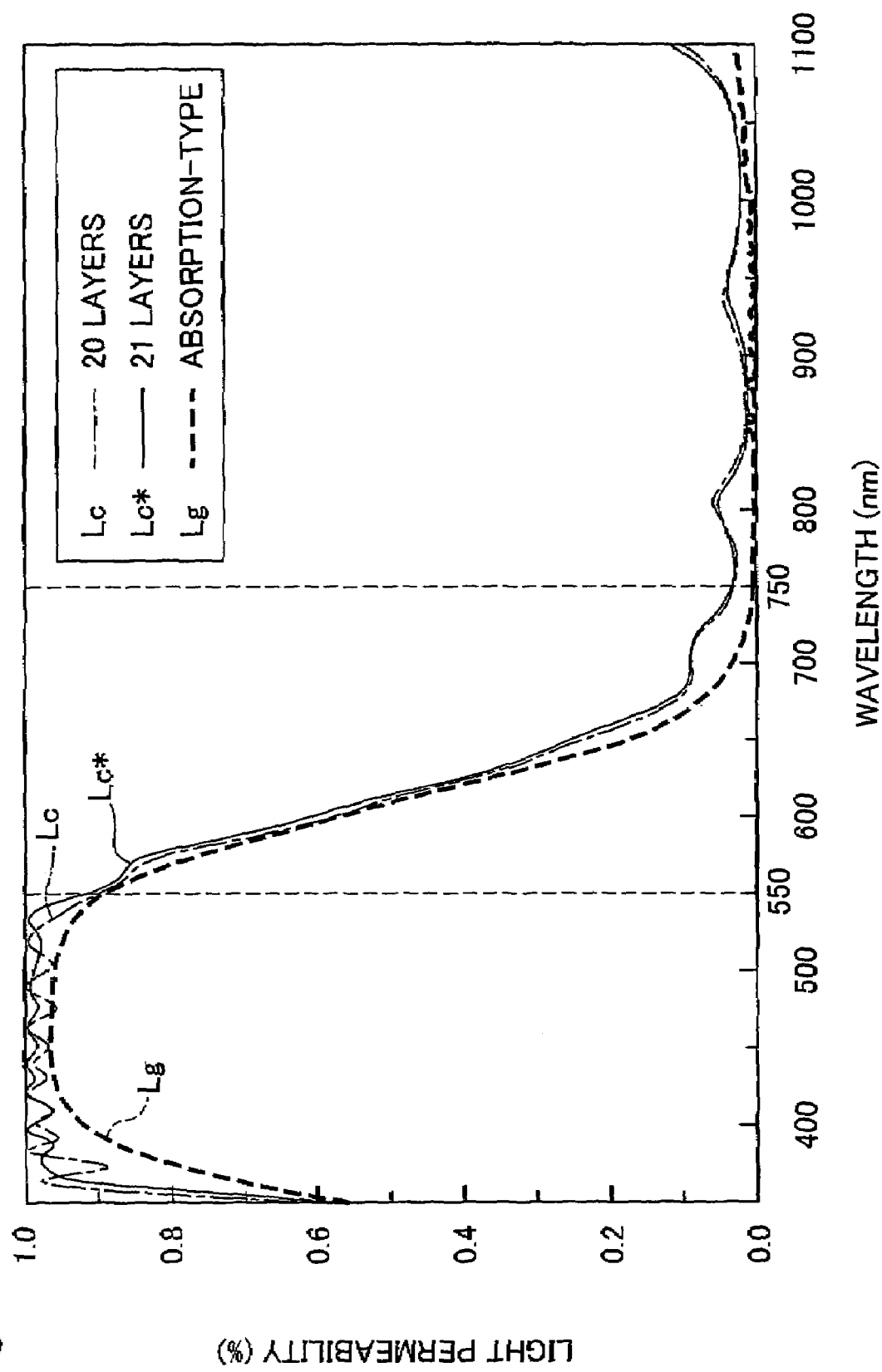
FIG. 14 shows the light permeability characteristic of the infrared ray cut filter 30 of the ninth embodiment.

The light permeability characteristic of the infrared ray cut filter 30 of the ninth embodiment will now be described. FIG. 14 is an explanatory drawing showing the light permeability characteristic of the infrared ray cut filter 30 of the ninth embodiment. In FIG. 14, the light wavelength is shown on the horizontal axis and the light permeability is shown on the vertical axis. The curve Lc in FIG. 14 shows the light permeability characteristic of the infrared ray cut filter 10 that includes the 20-layer multilayer membrane 200 of the third embodiment shown in FIG. 8. The curve Lc* in FIG. 14 shows the light permeability characteristic of the 21-layer infrared ray cut filter 30 of the ninth embodiment shown in FIG. 13. The curve Lg in FIG. 14 shows the light permeability characteristic of an absorption-type infrared ray cut filter.

As shown in FIG. 14, the light permeability characteristic Lc* of the infrared ray cut filter 30 of the ninth embodiment exhibits a light permeability of at least 90% for light in the wavelength band of 400–550 nm. Light permeability decreases gradually in the wavelength band of 550–750 nm, and falls to 10% or lower in the wavelength band of 750–1050 nm. Accordingly, the light permeability characteristic Lc* the infrared ray cut filter 30 of the ninth embodiment is essentially identical to the light permeability characteristic Lg of the absorption-type infrared ray cut filter. Moreover, the light permeability characteristic Lc* of the infrared ray cut filter 30 exhibits less rippling within the 400–550 nm visible light range than the light permeability characteristic Lc of the infrared ray cut filter 10 of the third embodiment.

According to the infrared ray cut filter 30 of the ninth embodiment described above, the same effect as that obtained with the third embodiment can be obtained, and fluctuations in light permeability within the visible light spectrum range due to a difference in the refractive indices of the transparent substrate 100 and the first high-refractive index thin membrane layer 210 can be prevented. In addition, because the multilayer membrane 200 can be easily removed from the transparent substrate 100 using a remover, the membrane can be easily re-formed even in the event of a defect in the formation of the multilayer membrane 200. Moreover, the adhesion between the transparent substrate 100 and the multilayer membrane 200 can be increased. In the ninth embodiment, a medium-refractive index thin membrane 300 was disposed in the 20-layer infrared ray cut filter 10 of the third embodiment, but the same effect can be obtained where the medium-refractive index thin membrane 300 is disposed in the infrared ray cut filters 10 of the first through eighth embodiments having no less than 16 but no more than 32 layers. In addition, the optical thickness values of the various layers are not limited to the values shown in FIG. 13, and can be freely changed within the membrane thickness condition described above in view of the desired light permeability characteristic and manufacturing efficiency.

Figure 15:
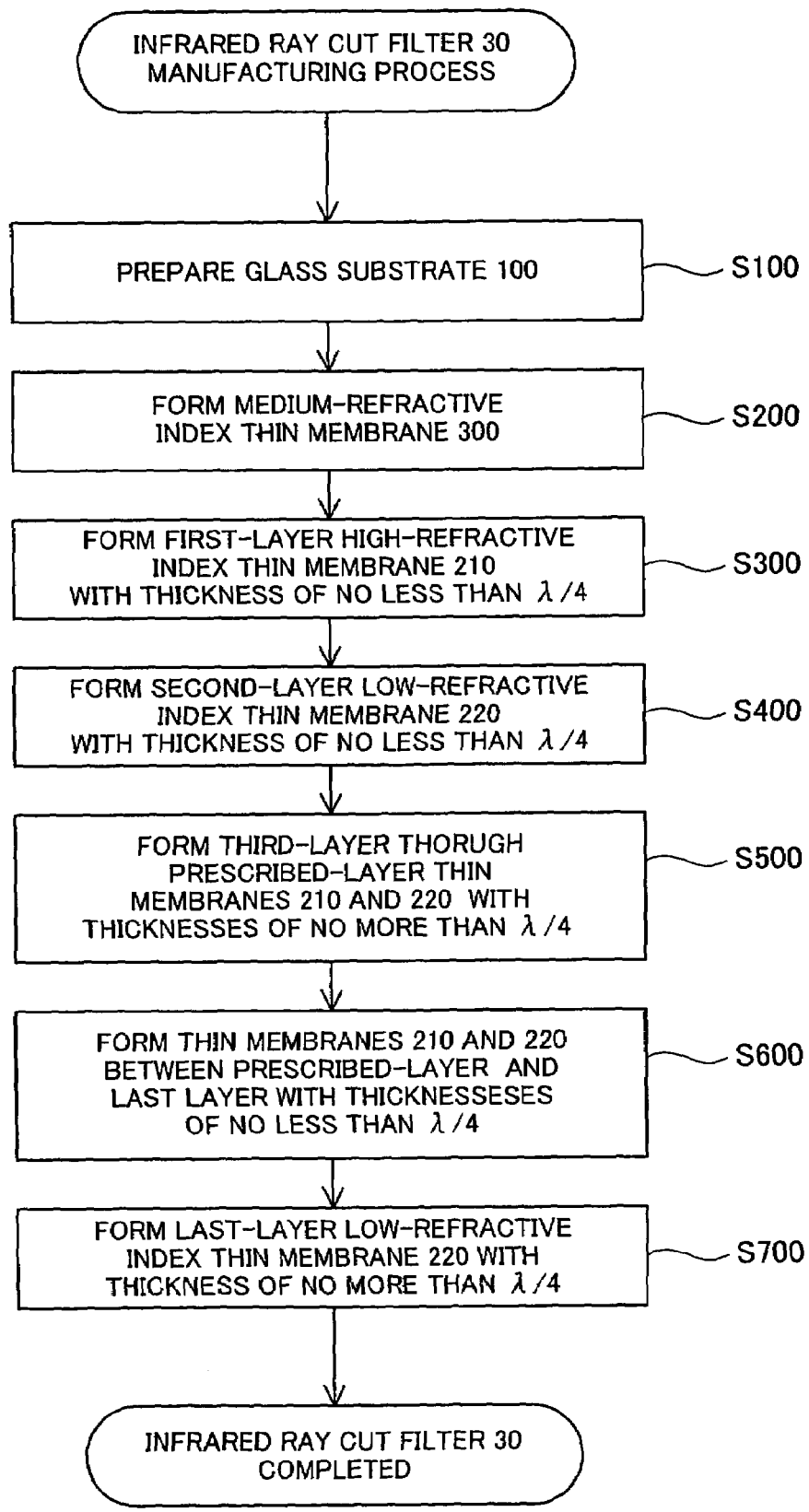
FIG. 15 shows the basic steps of the manufacturing method for the infrared ray cut filter 30.

The manufacturing method for the infrared ray cut filter 30 of the embodiment shown in FIG. 12 will now be described. FIG. 15 is an explanatory drawing showing the basic steps of the manufacturing process for the infrared ray cut filter 30. In this manufacturing process, titanium dioxide ($TiO_2$) is used in the high-refractive index thin membranes 210 as a high-refractive index material, silicon dioxide ($SiO_2$) is used in the low-refractive index thin membranes 220 as a low-refractive index material, and aluminum oxide ($Al_2O_3$) is used in the medium-refractive index thin membrane 300 as a medium-refractive index material.

When the infrared ray cut filter 30 is to be manufactured, first, a glass substrate 100 is prepared (step S100). A medium refractive index thin membrane 300 is formed on the prepared glass substrate 100 with a prescribed membrane thickness (such as the optical thickness shown in FIG. 13) (step S200). The infrared ray cut filter 20 shown in FIG. 1 can be manufactured by omitting this step of forming the medium-refractive index thin membrane 300 (step S200).

After the medium-refractive index thin membrane 300 is formed (step S200), a high-refractive index thin membrane 210 constituting a first layer is formed on this medium-refractive index thin membrane 300 with an optical thickness of no less than $\lambda/4$ (step S300). A low-refractive index thin membrane 220 constituting a second layer is then formed on this first-layer high-refractive index thin membrane 210 with an optical thickness of no less than $\lambda/4$ (step S400).

Next, as the third layer up to a prescribed layer (the sixth layer in the example shown in FIG. 13), high-refractive index thin membranes 210 and low-refractive index thin membranes 220 are formed with thicknesses of no more than $\lambda/4$ on top of the second-layer low-refractive index thin membrane 220 in an alternating fashion (step S500), and the layers between the prescribed layer and the last layer (the seventh through 19$^{th}$ layers in the example shown in FIG. 13) are formed over the prescribed layer in an alternating fashion with optical thicknesses of no less than $\lambda/4$ (step S600).

The infrared ray cut filter 30 is then completed by forming a low-refractive index thin membrane 220 as the last layer with an optical thickness of no more than $\lambda/4$.

While embodiments of the present invention have been described above, the present invention is not limited in any way by these embodiments, and various implementations of the invention are naturally possible within the essential scope thereof. For example, the glass substrate need not be made of crystal, and may be formed of any material that has a refractive index that is lower than that of the high-refractive index material. Moreover, the present invention need not be integrally formed with an optical component, and may comprise an independent infrared ray cut filter. In addition, the high-refractive index material need not constitute titanium dioxide ($TiO_2$), and may instead constitute tantalum pentoxide ($Ta_2O_5$), zirconium dioxide ($ZrO_2$), hafnium dioxide ($HfO_2$) or the like. The low-refractive index material may constitute silicon dioxide (SiO2), magnesium fluoride (MgF2) or the like. Aluminum oxide ($Al_2O_3$), a medium-refractive index material, may be used instead of the low-refractive index material. These materials may be used individually or in combination.

What is claimed is:

1. An infrared ray cut filter comprising:
   a transparent substrate; and
   a multilayer membrane including multiple high-refractive index thin membranes of a high-refractive index material and multiple low-refractive index thin membranes of a low-refractive index material, which are laid on said transparent substrate in an alternating fashion, said multilayer membrane having thin membrane layers of no less than 16 but no more than 32,
   wherein:
   a design wavelength λ for the thin membrane layers is 750 nm,
   a first layer of said multilayer membrane from a side of said transparent substrate is one of said high-refractive index thin membranes and is formed to have an optical thickness of no less than $\lambda/4$;
   a second layer of said multilayer membrane is formed to have an optical thickness of no less than $\lambda/4$;
   each layer from a third layer through a prescribed layer of said multilayer membrane is formed to have an optical thickness of no more than $\lambda/4$;
   each layer sandwiched in between said prescribed layer and a last layer of said multilayer membrane is formed to have an optical thickness of no less than $\lambda/4$; and
   said last layer is one of said low-refractive index thin membranes and is formed to have an optical thickness of no more than $\lambda/4$.

2. The infrared ray cut filter according to claim 1, wherein said prescribed layer is a sixth or seventh layer of said multilayer membrane from the side of said transparent substrate.

3. The infrared ray cut filter according to claim 1, wherein said low-refractive index thin membranes are made of $TiO_2$, and said high-refractive index thin membranes are made of SiO2 or $MgF_2$.

4. The infrared ray cut filter according to claim 1, wherein a medium-refractive index thin membrane composed of a medium-refractive index material is disposed between said transparent substrate and said multilayer thin membrane.

5. The infrared ray cut filter according to claim 1, wherein a medium-refractive index thin membrane composed of $Al_2O_3$ is disposed between said transparent substrate and said multilayer membrane.

6. The infrared ray cut filter according to claim 1, wherein said filter has a light permeability characteristic wherein light permeability decreases gradually as the light wavelength increases from 550 nm to 750 nm.

* * * * *